Oct. 1, 1929.  H. HARGREAVES  1,729,777

ELECTRICALLY HEATED WATER BOILER

Filed Aug. 8, 1928  2 Sheets-Sheet 1

INVENTOR:
Harold Hargreaves
BY: Reeves, Boyer & Bateler
ATTORNEYS

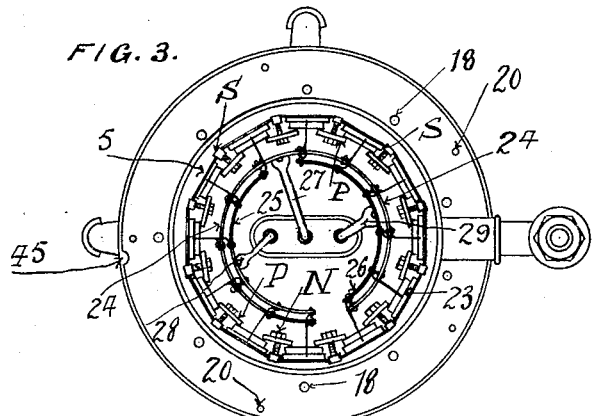
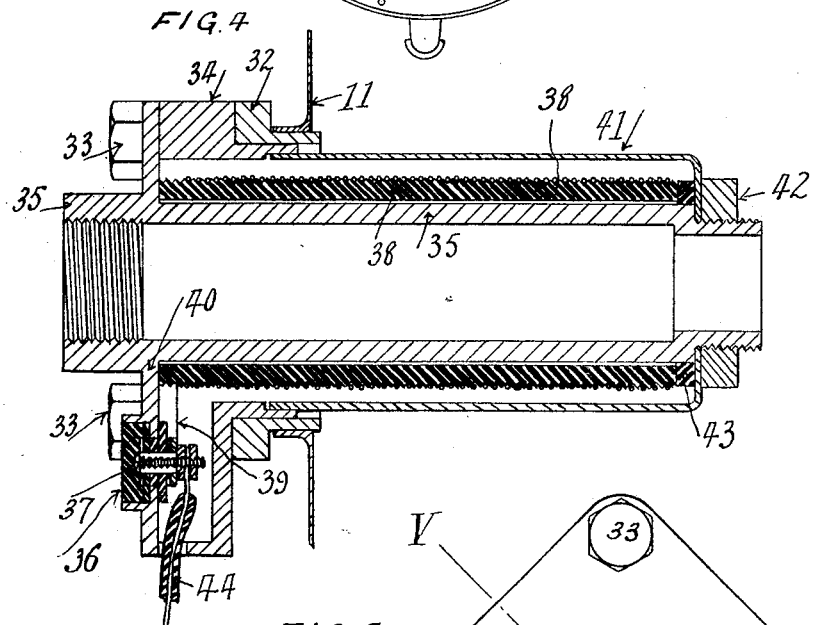
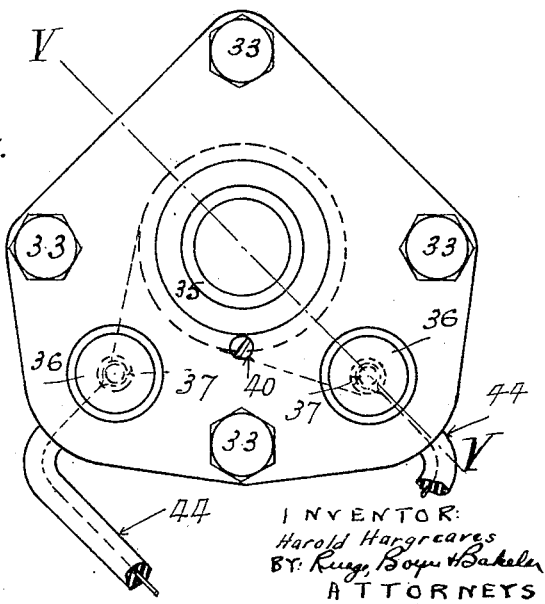

Patented Oct. 1, 1929

1,729,777

UNITED STATES PATENT OFFICE

HAROLD HARGREAVES, OF BURNLEY, ENGLAND

ELECTRICALLY-HEATED WATER BOILER

Application filed August 8, 1928, Serial No. 298,320, and in Great Britain September 14, 1927.

These improvements relate to electrically heated self-feeding water boilers of the type wherein a collecting chamber is gradually filled with boiling water from an expansion pipe, the top of the expansion pipe being above the normal water level.

The salient feature is the feeding of supply water direct to the boiling chamber from a supply cistern with ball tap located outside the boiler proper there being a draw-off tap connected towards the bottom of the collecting chamber. Further features are, an improved construction of electrical heating structure and an electrically heated draw-off tap both of which can with advantage be combined in a structure where the feed water is supplied direct to the boiling chamber from an outside cistern.

The object of my invention is to provide a simple construction of electrically heated boiler suitable for low loading which will give a large quantity of actually boiling water at one "draw", independent of the use of pre-heated feed water, and wherein the water ways are simple and easily accessible for removal of fur, etc. Provision is also made for the employment of a more durable type of electrical heating structure than has hitherto been used in this class of boiler; and for heating the collecting chamber preferably at the draw-off tap in order to maintain actual boiling point and to avoid the drop in temperature which usually occurs due to the cooling effect of the draw-off tap. "Lagging" or heat insulation of all hot surfaces is also provided giving increased efficiency.

Previous constructions have usually employed some form of pre-heating a bulk supply of water for feeding the boiling chamber in order to obtain a large quantity of boiling water. This entails somewhat complicated water ways and considerable loss of heat, particularly where the bulk water is heated by the admixture of boiling water. In the latter case, excessive fur is also liable to be formed, as the water is boiled a number of times in the course of heating up the bulk water.

According to the invention, feed water is led direct from an exterior ball tap feed cistern to the boiling chamber which in turn delivers boiling water into a large capacity collecting chamber, the diameter and height of which can be made sufficient to supply the largest quantity of water required at one "draw". An overflow fitting connects the top of the collecting chamber with the ball tap feed cistern. This fitting also serves as an outlet for steam from the collecting chamber and also to return water from the collecting chamber to the cistern if the current should be left "on" after the collecting chamber is full. The draw-off tap is preferably fixed to an electrically heated fitting in order to counteract the cooling effect of the draw-off tap. This fitting may also serve to maintain boiling point in the collecting chamber when the main electrical heating element is switched off. The main heating elements are preferably of the "clamp-on" type, and are adapted to be fitted to the inner walls of a bell-shaped chamber fixed to the boiler structure by a flange. On removing the element chamber, all principal surfaces liable to accumulate fur are exposed for cleaning. A gauge glass may be connected to the collecting chamber to show the amount of boiling water available at any time for drawing-off. The main heating elements may be controlled by a 3 heat or simple "on" and "off" switch, according to the amount of boiling water required, but a "bye-pass" element is kept "on" during the whole time the boiler is in use, in order to maintain boiling point.

The improvements are hereafter described in detail and with reference to the accompanying two sheets of drawings, wherein:

Fig. 3 is a sectional plan of the main heating elements, etc. the view being taken on the line I—I Fig. 1.

Fig. 4 is a sectional elevation of the heating structure for the draw off tap the same being taken on the line V—V Fig. 5.

Fig. 5 is an end view of said heating structure for the draw-off tap.

Figure 1:
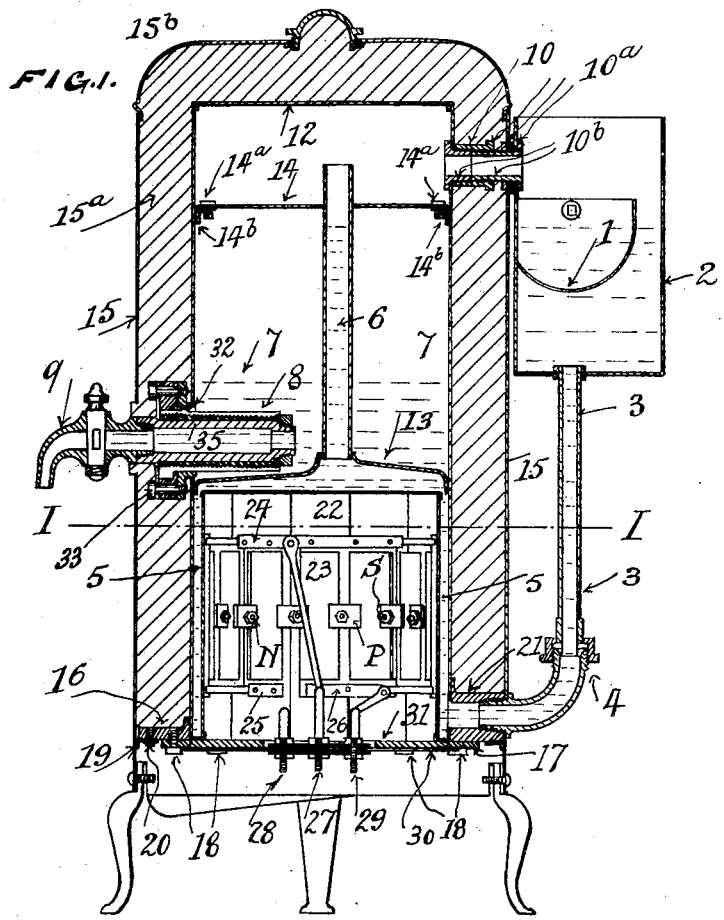
Fig. 1 is a vertical sectional elevation of the boiler structure and taken on the line II—II Fig. 2.
Figure 2:
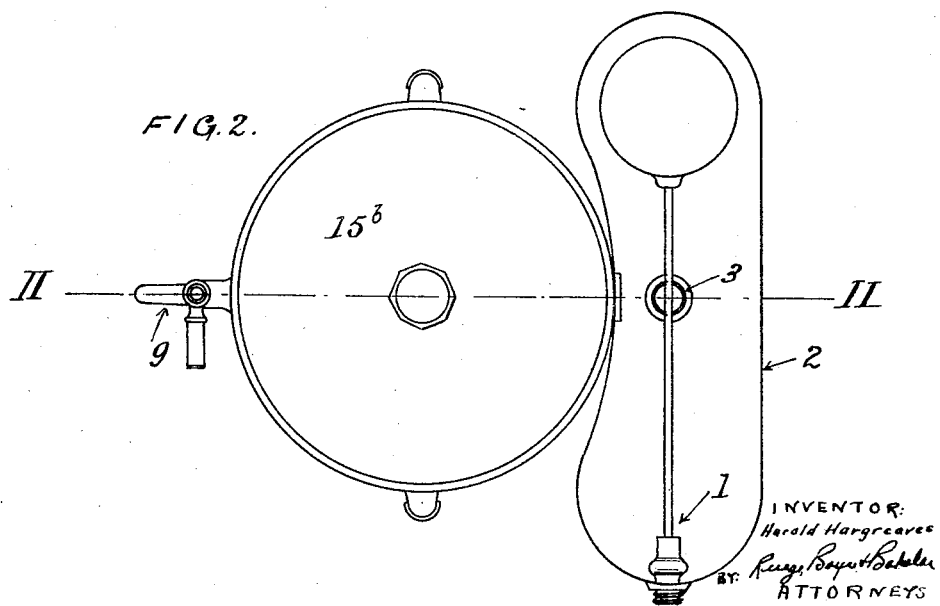
Fig. 2 shows a plan view of the boiler structure.

According to my invention I arrange to feed direct to the boiling chamber from an outside supply cistern fitted adjacent to the boiler shell and the construction is to this end. The ball tap structure is marked 1 and this automatically controls the supply of feed water to the cistern 2. The water supplied to the cistern 2 descends by the pipe 3 and elbow union fitting 4 to the boiling chamber 5 in the top of which is fixed the expansion pipe 6, the top of which is above the normal level of water in the feed cistern. The collecting chamber is marked 7 and towards the bottom thereof is fixed the electrically heated fitting 8 through which water passes to the draw-off tap 9. There is an overflow fitting intermediate of the collecting chamber 7 and the feed cistern 2 and 10, 10$^a$, 10$^b$ are respectively the coupling, nuts and nipples of the over-flow fitting and the construction shown facilitates disconnection.

The cylindrical chamber constituting the inner wall of the boiler structure is lettered 11 and it is closed at the top by the cover 12, which may be fixed by a flange. The cylindrical chamber 11 is divided by a conical plate 13 which is fixed to 11 and divides the boiling chamber 5 from the collecting chamber 7. The letter 14 denotes a supporting bar for the expansion pipe 6 and is preferably attached by screws 14$^a$ to lugs 14$^b$ fixed to the cylindrical chamber. The external casing is lettered 15 and an annular space exists between 11 and 15 which is fitted with heat insulating material such as granulated cork 15$^a$. A cover 15$^b$ is provided. The cylindrical chamber 11 is fixed to a flange 16 and 17 is another flange which is secured to the flange 16 by bolts 18. The flange 16 extends over the flange 17 and such flange 16 rests on and is secured to a rim 19 by screws 20. The rim 19 is soldered or otherwise fixed to the external casing 15. 21 is a boss preferably cast along with flange 16 and to which the elbow fitting 4 is attached. 22 is the element chamber which has a considerable number of flat sides and is closed at the top whilst its lower edge has an inherent rim or flange which is clamped between the flange 16 and ring 17 by studs 18 in manner to make a water tight joint. Each flat side of the element chamber 22 has a heating element 23 clamped to it, common practice being by means of screws S, clamping plates P and nuts N. The heating elements 23 are preferably connected electrically by the rings 24, 25, 26 to rods 27, 28, 29, which are fixed in the cover plate 30 by means of insulation washers, nuts, etc. in known fashion and these rods 27, 28 and 29 serve as terminals. According to the arrangement shown, the terminals can be used for 3 heat control, but the internal connections to the heating elements can be varied to suit requirements. 31 is an asbestos or other suitable plate for shielding the cover plate 30 from the internal heat of the chamber. It will be seen that by removing the bolts 18, the element chamber 22 and bottom flange 17, etc. can be withdrawn, leaving the interior of the boiler accessible for cleaning.

The draw-off tap fitting with the tap 9 removed is shown very clearly by Figs. 4 and 5. The boss 32 is soldered or otherwise fixed to internal casing 11 and is tapered to receive the bolts 33 which clamp the sections 34, 35 to the boss 32 so as to make a water tight joint. 36 are bosses in which are sunk the heads of terminal screws 37. The said bosses are then filled in with insulating material such as plaster of Paris. 38 is a porcelain former which fits over the tubular section of 35. A "two-start" or double thread is formed on the surface of 38 which is wound with heating wire 39. The heating wire is preferably doubled on itself, the middle or bend of the wire being "anchored" at the opposite end from the terminals, and each end of the wire is brought to one of the terminal screws 37. A grub screw 40 extends through 35 and engages in a corresponding recess in 38, in order to prevent 38 being turned by the tension of the heating wire. 41 is a tube brazed or otherwise fixed in 34. The device 35 is screw threaded for the nut 42 which clamps the end of 41 against the shoulder on 35. Suitable packing is used to produce water-tight joints and 43 are washers of insulating material between 38 and 41. 44 are insulated wires carrying current to and from 37. 44, 39 and 37 are secured by nuts, insulating washers, etc., as is common practice.

The wires 44 pass through a cut-away portion 45 of the flange 16 and a corresponding hole in the rim 19. The draw off tap element may be connected in parallel with one or more of the main heating elements or in series with one or more of the main elements. The main elements may be wired in series of two or more in order that thicker wire may be used allowing a lower working temperature and longer life. The element chamber 22 may be made deeper to accommodate more elements if desired.

I declare that what I claim is:

1. In an electrically heated self-feeding boiler, a boiler structure, a collecting chamber, a boiling chamber, an expansion pipe leading from the boiling chamber to the collecting chamber, the top of said pipe being located above the normal water level, an exterior water supply cistern adjacent to the boiler structure, automatic controlling means for the supply cistern, and a connection from the supply cistern to the boiling chamber, the water supply feeding direct into the boiling chamber.

2. An electrically heated self-feeding boiler comprising a boiler structure, a collecting chamber therein, a boiling chamber, an upright expansion pipe leading from the boiling chamber to the collecting chamber, an exterior water supply cistern in connection with the boiler structure, automatic valve controlling means for the cistern, a pipe connection from the exterior water supply cistern and leading to the boiling chamber and an overflow connection between the collecting chamber and the exterior water supply cistern.

3. An electrically heated self-feeding boiler comprising a boiler structure, an internal boiling chamber, an internal collecting chamber, an upstanding expansion pipe leading to the collecting chamber and discharging at a level above the normal water level in the boiler, an exterior water supply cistern in connection with the boiler structure, a control valve for said cistern, a pipe connection from the cistern leading into the boiling chamber, and an overflow connection between the collecting chamber and the exterior water supply cistern all for the purposes related.

4. An electrically heated self-feeding boiler consisting of a boiler structure, a boiling chamber, a collecting chamber above said boiling chamber, an upstanding expansion pipe leading from the boiling chamber to the upper part of the collecting chamber and having its discharge orifice above the normal water level, an exterior water supply cistern, automatic control means for the supply cistern, a connection from the supply cistern to the boiling chamber, and a heating device located in the collecting chamber for raising the temperature of the water in the collecting chamber.

5. An electrically heated self-feeding boiler consisting of a boiler structure, a boiling chamber, a collecting chamber above said boiling chamber, an expansion pipe connecting the boiling chamber with the collecting chamber, said expansion pipe discharging above the normal water level in the boiler, an exterior water supply cistern adjacent to the boiler structure, automatic control means for the supply cistern, a connection therefrom to the boiling chamber, an electrically heated device for the collecting chamber, and a draw-off tap combined therewith all as described.

6. An electrically heated self-feeding boiler comprising a boiler structure, a collecting chamber, a boiling chamber, an expansion pipe, an exterior water supply cistern adjacent to the boiler structure, a control valve therein, a pipe leading from the exterior water supply cistern direct into the boiling chamber, an overflow pipe between the exterior water supply pipe and the collecting chamber, a removable casing located in the boiling chamber, heating elements secured thereto and wiring provision for conveying current to and from the heating elements, and means permitting the removable casing to be detached.

7. An electrically heated self-feeding boiler comprising a boiler structure, a collecting chamber, a boiling chamber, an expansion pipe, an exterior water supply cistern connected to the boiler structure, a control valve in said cistern, a pipe connecting the said cistern directly to the boiling chamber, an overflow connection, removable heating provision located in the boiling chamber, and a sleeve structure provided in the collecting chamber, electrical heating provision therefor, and a withdraw tap in combination with said sleeve structure, all for the purposes related.

8. An electrically heated self-feeding boiler comprising a boiler structure, a collecting chamber therein, a boiling chamber, an outside feed water cistern, valve controlling means therefor, a pipe connection from the feedwater cistern direct to the boiling chamber, an overflow connection intermediate of the collecting chamber and the feed water cistern, an overflow pipe from the boiling chamber, a removable casing located in the boiling chamber, heating elements attached thereto and outlet connections for the heating current, detachable connections for the removable casing, and a sleeve structure projecting into the collecting chamber, means for attaching same, means to electrically heat the sleeve structure, and a withdraw tap combined with the sleeve structure.

In testimony whereof I have signed my name to this specification.

HAROLD HARGREAVES.